United States Patent
Johns

(10) Patent No.: US 12,301,377 B1
(45) Date of Patent: May 13, 2025

(54) DETERMINING SERVICE GROUP CAPACITY

(71) Applicant: Charter Communications Operating, LLC, St. Louis, MO (US)

(72) Inventor: Craig Joseph Johns, Northglenn, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 147 days.

(21) Appl. No.: 18/339,824

(22) Filed: Jun. 22, 2023

(51) Int. Cl.
*H04L 12/28* (2006.01)
*H04L 41/0896* (2022.01)

(52) U.S. Cl.
CPC ...... *H04L 12/2801* (2013.01); *H04L 41/0896* (2013.01)

(58) Field of Classification Search
CPC ................. H04L 12/2801; H04L 41/0896
See application file for complete search history.

(56) References Cited

U.S. PATENT DOCUMENTS

| | | | |
|---|---|---|---|
| 7,406,299 B1* | 7/2008 | Hudson | H04L 45/22 455/426.1 |
| 2020/0245192 A1* | 7/2020 | Roy | H04L 47/24 |

\* cited by examiner

*Primary Examiner* — Jefferey F Harold
*Assistant Examiner* — Franklin S Andramuno
(74) *Attorney, Agent, or Firm* — Dority & Manning, P.A.

(57) ABSTRACT

A computing system fits a long-term utilization line through aggregate utilization values that correspond to ones of a plurality of intervals over a time period. The computing system determines, for each respective interval of/ordinal intervals in each second time period within the time period, a mean residual value based on a difference between a utilization value identified on the long-term utilization line at the respective interval and an actual aggregate utilization value at a same ordinal interval in each second time period. An aggregate probability value, based in part on a probability that a cable modem of a plurality of cable modems can obtain at one or more intervals a maximum bandwidth allocated to the cable modem, is determined, and in response to determining that the aggregate probability value is a non-preferred value, an alert, indicating that the service group is overutilized, is sent.

20 Claims, 9 Drawing Sheets

DETERMINING SERVICE GROUP CAPACITY

BACKGROUND

A service group of cable modems share the same service group bandwidth and at times, if sufficient numbers of cable modems in the service group are all actively downloading data, may overwhelm the maximum bandwidth of the service group.

SUMMARY

The embodiments disclosed herein implement mechanisms for objectively determining whether a service group has sufficient capacity to service the cable modems in the service group based on historical service group utilization and predetermined thresholds.

In one embodiment a method is provided. The method includes fitting, by a computing system, a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having/ordinal intervals. The method further includes determining, by the computing system, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time. The method further includes determining, by the computing system, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem. The method further includes in response to determining that the aggregate probability value is a non-preferred value, sending an alert indicating that the service group is overutilized.

In another embodiment a computing system is provided. The computing system includes one or more computing devices operable to fit a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having/ordinal intervals. The one or more computing devices are further operable to determine, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time. The one or more computing devices are further operable to determine, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem. The one or more computing devices are further operable to, in response to determining that the aggregate probability value is a non-preferred value, send an alert indicating that the service group is overutilized.

In another embodiment a non-transitory computer-readable storage medium is provided. The non-transitory computer-readable storage medium includes executable instructions to cause one or more computing devices to fit a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having/ordinal intervals. The instructions are further operable to cause the one or more computing devices to determine, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time. The instructions are further operable to cause the one or more computing devices to determine, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem. The instructions are further operable to cause the one or more computing devices to, in response to determining that the aggregate probability value is a non-preferred value, send an alert indicating that the service group is overutilized.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
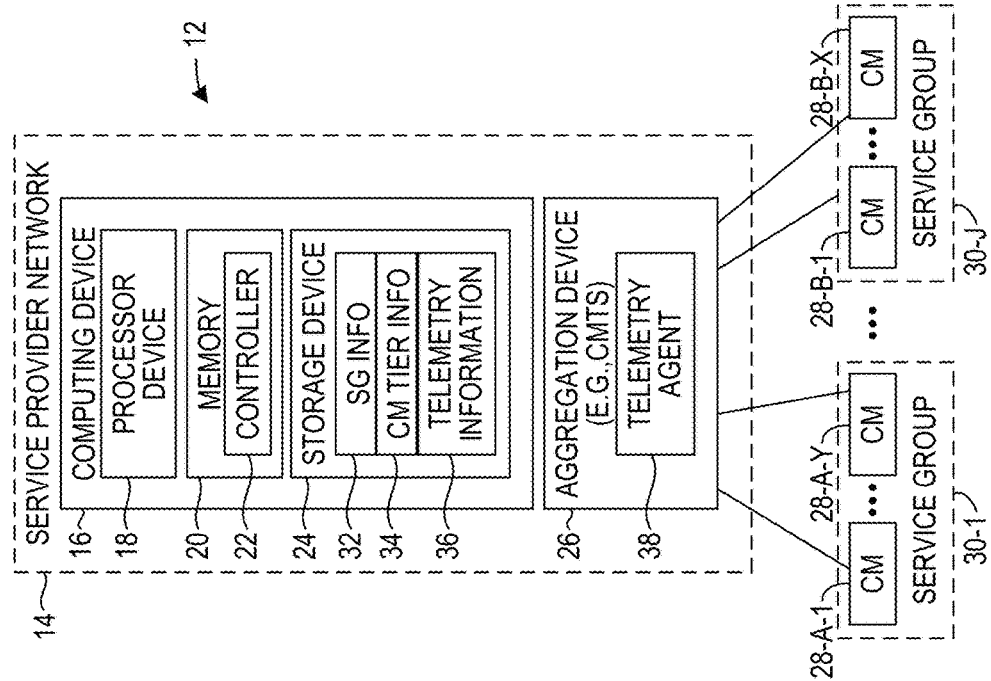
FIG. 1 is a block diagram of an environment suitable for determining service group capacity according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A single cable modem termination system (CMTS) provides services to many cable modems, such as tens of thousands of cable modems. Cable modems are organized into service groups wherein each cable modem in a service group is serviced by the same channel or channels and thus shares the aggregate bandwidth of the service group. A CMTS may implement a plurality of service groups. A service group has a maximum bandwidth that is shared by all the cable modems in the service group. For purposes of brevity, the cable modems served by a service group may sometimes be referred to herein as the group of cable modems "in" the service group.

Cable modems in the same service group are often provisioned with different service (e.g., speed) tiers based on a pricing structure. Thus, for example, a subset of cable modems in a service group may be provisioned with a 1 Gbps service tier, meaning that the subset of cable modems should be able to achieve a 1 Gbps data transfer rate upon request, another subset of cable modems in the service group may be provisioned with a 600 Mbps service tier, and another subset of cable modems in the service group may be provisioned with a 200 Mbps service tier.

Changes to a service group to increase capacity or change (e.g., reduce) the group of cable modems served by the service group require physical changes to hardware. Accordingly, a technician must be dispatched to one or more locations if such a change to a service group is desired. This process is relatively costly and time-consuming, and thus it is preferable to change a service group only when necessary to provide adequate service to the group of cable modems in the service group. However, determining what constitutes adequate service can be difficult because a lower service tier of the cable modems in the service group (e.g., those at a 100 Mbps service tier) may be adequately serviced 99% of the time, and another, higher service tier (e.g., those at a 1000 Mbps service tier) may be adequately serviced only 70% of the time, and thus knowing when to alter a service group can be a difficult decision.

The embodiments disclosed herein implement mechanisms for objectively determining whether a service group has sufficient capacity to service the cable modems in the service group based on historical service group utilization and predetermined thresholds.

FIG. 1 is a block diagram of an environment 10 suitable for determining service group capacity according to some embodiments. The environment 10 includes a computing system 12 that includes one or more computing devices that compose a service provider network 14. In this example, the computing system 12 includes a computing device 16 that includes a processor device 18 coupled to a memory 20. The memory 20 includes a controller 22 that implements certain of the functionality discussed herein. It is noted that for purposes of illustration such functionality is depicted as being implemented by a single component on a single computing device; however, in other embodiments, the functionality described herein may be distributed across multiple devices in the computing system 12. Moreover, in practice, the service provider network 14 may include hundreds or thousands of computing devices. The computing device 16 includes or is communicatively coupled to a storage device 24.

The computing system 12 also includes a plurality of aggregation devices 26, such as cable modem termination systems (CMTSs), although for purposes of simplicity and explanation only a single aggregation device 26 is illustrated. The aggregation device 26 communicates with thousands or tens of thousands of cable modems 28-A-1-28-A-Y and 28-B-1-28-B-X (generally, cable modems 28) that are located in subscribers' premises, such as houses or offices. The aggregation device 26 also communicates with upstream computing devices (not illustrated) in the service provider network 14 to facilitate communications between the cable modems 28 and other networks, such as the Internet.

The aggregation device 26 implements a plurality of service groups 30-1-30-J (generally, service groups 30). The cable modems 28-A-1-28-A-Y are in the service group 30-1, and the cable modems 28-B-1-28-B-X are in the service group 30-J. Each service group 30 has an associated maximum bandwidth allocated to the service group 30. Each cable modem 28 in a service group 30 shares the same group of channels and thus shares the aggregate bandwidth of the service group 30.

Each cable modem 28 has an associated service tier that is typically based on a pricing structure implemented by the service provider. The service tier is in essence a speed tier because the service tier identifies a maximum instantaneous bandwidth for the cable modem 28. For example, a first subset of cable modems 28 in the service group 30-1 may be in a 1 Gbps service tier and is thus provisioned to obtain a maximum bandwidth of 1 Gbps. A second subset of cable modems 28 in the service group 30-1 may be provisioned with a 600 Mbps service tier, and another subset of cable modems 28 in the service group 30-1 may be provisioned with a 200 Mbps service tier. There may be any number of service tiers in a service group 30.

Table 1 below provides an example of the number of cable modems 28 and corresponding service tiers (also referred to herein as speed tiers).

TABLE 1

| SPEED TIER (DOWNSTREAM IN MBPS) | N MODEMS | WEIGHT |
|---|---|---|
| 20 | 5 | 4 |
| 30 | 4 | 5 |
| 60 | 15 | 7 |
| 100 | 19 | 10 |
| 200 | 12 | 15 |
| 300 | 206 | 17 |
| 400 | 124 | 20 |
| 600 | 3 | 24 |
| 1000 | 11 | 30 |

Changes to a service group 30 to increase capacity or change (e.g., reduce) the group of cable modems 28 served by the service group 30 require physical changes to the aggregation device 26. Accordingly, a technician must be dispatched to the location of the aggregation device 26 if such a change to a service group 30 is desired. This process is relatively costly and time-consuming, and thus it is preferable to change a service group 30 only when necessary to provide adequate service to the group of cable modems 28 in the service group 30.

In practice, the cable modems 28 in a service group 30 do not simultaneously attempt to obtain the entire provisioned bandwidth, and thus the configured maximum capacity of a service group 30 is typically less than the sum of the provisioned service tiers of each of the cable modems 28 in the service group 30. However, at times, a sufficient number of cable modems 28 in the service group 30 may attempt to concurrently utilize their allocated maximum bandwidth that the concurrent demand may exceed the configured maximum capacity of the service group 30. If this happens frequently, this may lead to customer dissatisfaction. However, the likelihood that a cable modem 28 cannot obtain the maximum provisioned bandwidth differs depending on the service tier. A cable modem 28 provisioned with a 1 Gbps service tier is more likely to be unable to obtain the maximum provisioned bandwidth than a cable modem 28 provisioned with a 100 Mbps service tier simply because the cable modem 28 provisioned with a 1 Gbps service needs 10 times the bandwidth of the cable modem 28 provisioned with the 100 Mbps service tier. Moreover, the number of cable modems 28 in each service tier may widely differ for a particular service group 30 and may widely differ across different service groups 30. Because of complexity and a number of variables, a service provider may simply wait until a sufficient number of customers complain that they are not obtaining the bandwidth they are entitled to before the service provider decides to alter the service group 30. Unfortunately, at that point, multiple customers may be dissatisfied, which can lead to customer loss.

There is typically a long-term utilization trend of a service group 30 wherein the utilization of the service group 30 by the cable modems 28 varies over time. For example, over a nine-month period, the utilization of the service group 30-1 may generally increase, or the utilization of the service group 30-1 may generally decrease. There are also short-term conditions that may cause significant variations in the utilization of the service group 30-1. As examples, during evening hours the service group 30-1 may generally have a greater utilization than during early morning hours. On Sundays, the service group 30-1 may have a greater utilization than on Wednesdays. These variations may differ from service group 30 to service group 30. For example, the cable modems 28 in a first service group 30 may be used by a neighborhood of football fans who view many football games on Sundays, driving utilization of the first service group 30 upward. The cable modems 28 in a second service group 30 may be used by a neighborhood of non-football fans such that there is no spike in utilization of the second service group 30 on Sundays.

In this multi-variable environment, there are heavy-utilization instants in time when a cable modem 28 cannot be provided the complete bandwidth of the service tier in which the cable modem 28 is provisioned because doing so would require more capacity than the service group 30 has at that instant in time. The greater the bandwidth of the service tier, the more likely it is that a cable modem 28 may not be able to be provided the compete bandwidth. While this may be acceptable when such instants in time are rare, as utilization of a service group generally increases the inability to obtain the provisioned bandwidth may occur frequently enough to lead to customer dissatisfaction. However, due to the multiple variables that effect utilization at any given instant in time, as discussed above, it is difficult or impossible to predict how often a cable modem 28 may not be able to be provided the complete bandwidth that the cable modem 28 is supposed to be provided.

The embodiments disclosed herein implement mechanisms for determining whether a service group 30 has sufficient capacity to service the cable modems 28 served by the service group 30 based on historical service group utilization.

The storage device 24 stores service group information 32 that identifies the service groups 30 of the aggregation device 26, and the cable modems 28 in the service groups 30. The storage device 24 stores cable modem tier information 34 that identifies, for each cable modem 28, the service tier (e.g., speed tier) of the cable modem 28.

On an ongoing basis, telemetry information 36 may be collected and stored on the storage device 24. The telemetry information 36 may include aggregate service group utilization values that identify aggregate service group bandwidth utilization at a particular instant in time for each service group 30. The aggregate service group utilization values may be taken at a periodic interval 1, such as each hour, each ½ hour, each 15 minutes, or the like. The telemetry information 36 may be collected and stored for any desired period of time such as months or years. In some embodiments, the telemetry information 36 is generated by a telemetry agent 38 executing on the aggregation device 26 that has been configured to determine the instantaneous aggregate service group utilization at the desired interval and send the instantaneous aggregate service group utilization to the controller 22 or another component for storage in the telemetry information 36.

With this background, an example of determining service group capacity for the service group 30-1 will be discussed. The controller 22 selects an extended period of time, such as, by way of non-limiting example, six months of telemetry information 36, that contains aggregate service group utilization values for the service group 30 at some interval. The extended period of time may be referred to herein as the first period of time. Each aggregate service group utilization value identifies an aggregate service group bandwidth utilization by the plurality of cable modems 28-A-1-28-A-Y in the service group 30-1 at a corresponding interval. In this example, the interval will be hourly, although in other examples the interval could be shorter or longer. Assuming six months of data, there may be approximately 4368 aggregate service group utilization values (i.e., 26 weeks * 7 days * 24 hourly intervals).

The controller 22, using a smoother algorithm, fits a smooth curve long-term service group utilization line through the aggregate service group utilization values. Any suitable smoother algorithm, such as, by way of non-limiting example, a LOESS smoother or two-sided windowed average smoother may be used.

Figure 2:
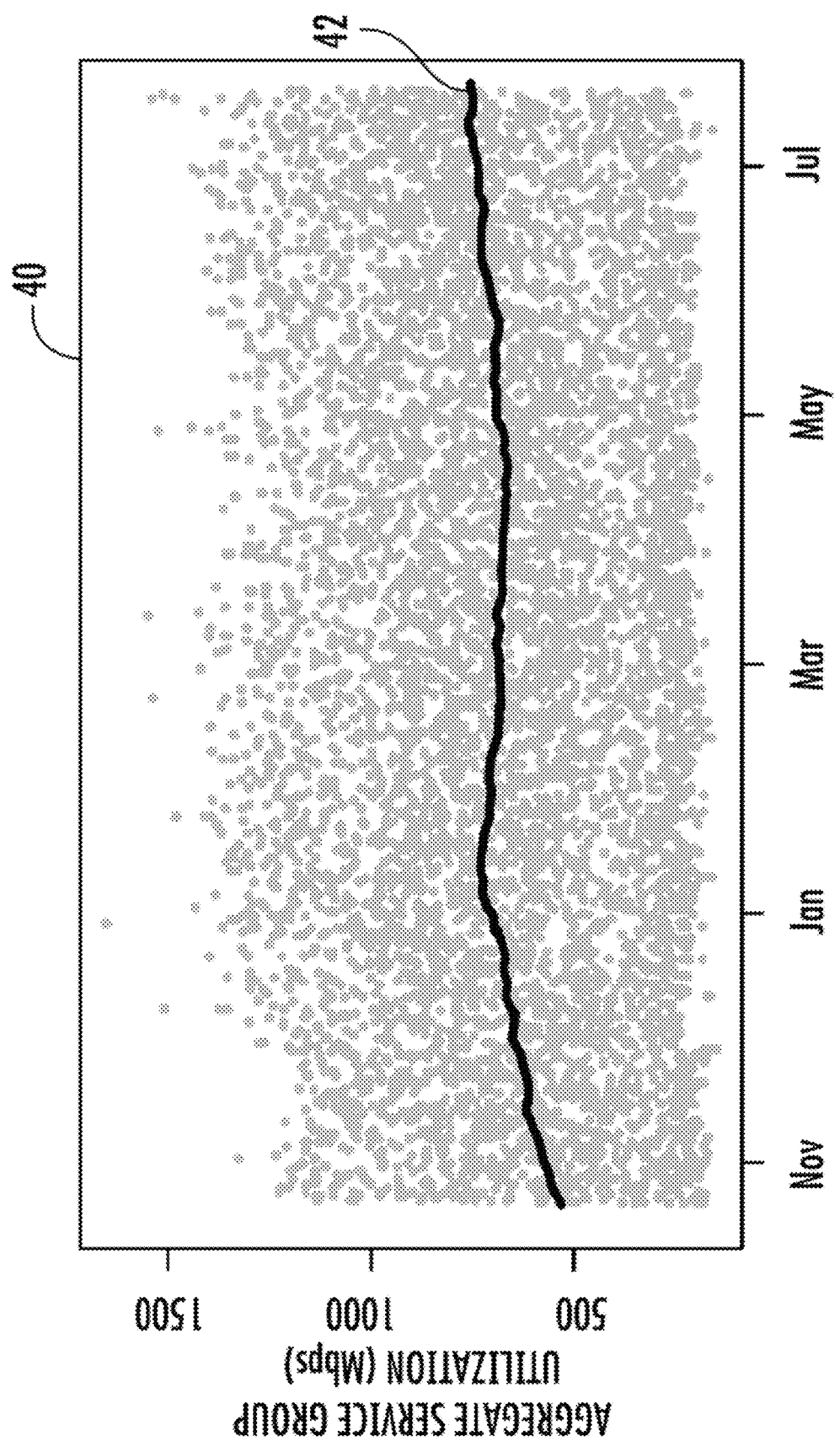
FIG. 2 illustrates a graph having an X-axis of time and a Y-axis of aggregate service group utilization on which a plurality of aggregate service group utilization values over a 5-6 month period have been plotted.

FIG. 2 illustrates a graph 40 having an X-axis of time and a Y-axis of aggregate service group utilization on which a plurality of aggregate service group utilization values over a 5-6 month period have been plotted. The controller 22 has fitted a smooth curve long-term service group utilization line 42 through the plurality of aggregate service group utilization values. The long-term service group utilization line 42 quantifies a general trend of utilization of the service group 30-1 over the first period of time, in this example, six months. Due to the size of the graph 40, it appears that multiple aggregate service group utilization values are plotted at the same time; however, the aggregate service group utilization values are one hour apart. The controller 22 determines based on the smooth curve long-term service group utilization line 42, a long-term service group utilization value at each interval.

The first period of time is composed of multiple second periods of time that have a same time duration. In this example, the second periods of time are weekly periods of time. Thus, in this example, assuming a first period of time of 6 months, the first period of time is composed of 26 second periods of time (e.g., 26 weeks). Each second period of time has a same number of ordinal time intervals at which an aggregate service group utilization value is obtained. In this example, the ordinal time intervals are hourly, and thus each second period of time has 168 (24*7) ordinal time intervals. The aggregate service group utilization values may be individually identified by the following term:

$U_{t,i}$, wherein t is the particular second period of time, i is the interval, and U is the value of the aggregate service group utilization value at the second period of time t and the interval i.

As an example, $U_{1,45}$ refers to the aggregate service group utilization value of the service group at week 1, hour 45. As another example, $U_{8,145}$ refers to the aggregate service group utilization value of the service group at week 8, hour 145.

To summarize, in this example, aggregate service group utilization values are obtained each hour of each day of each week for 26 weeks, resulting in approximately 4368 (168*26) data points. The long-term service group utilization line quantifies a general trend of utilization of the service group over the first period of time, in this example, six months.

The long-term service group utilization values may be individually identified by the following term:

$L_{t,i}$, wherein t is the particular second period of time, i is the interval, and L is the value of the long-term service group utilization value at the time period t and the interval i.

The controller 22 then calculates a residual value for each ordinal time interval i. In this example, 168 residual values are determined, each residual value corresponding to one of the intervals i in the second period of time. The residual value for each ordinal time interval i may be calculated pursuant to the following formula:

$$M_i = \frac{1}{T}\sum_{t=1}^{T}(U_{t,i} - L_{t,i})$$

wherein $M_i$ is the average residual value for the ordinal time interval i, and T is the number of second periods of time, in this example, 26. Thus, the residual value M is a 26-week average of the difference between the $U_{t,i}$ and $L_{t,i}$ for each ordinal interval i. For example, $M_i$ is the average of the 26 values that correspond to the difference between $U_{x,1}$ and $L_{x,1}$, for each of the 26 weeks, wherein t=1–26.

Figure 3:
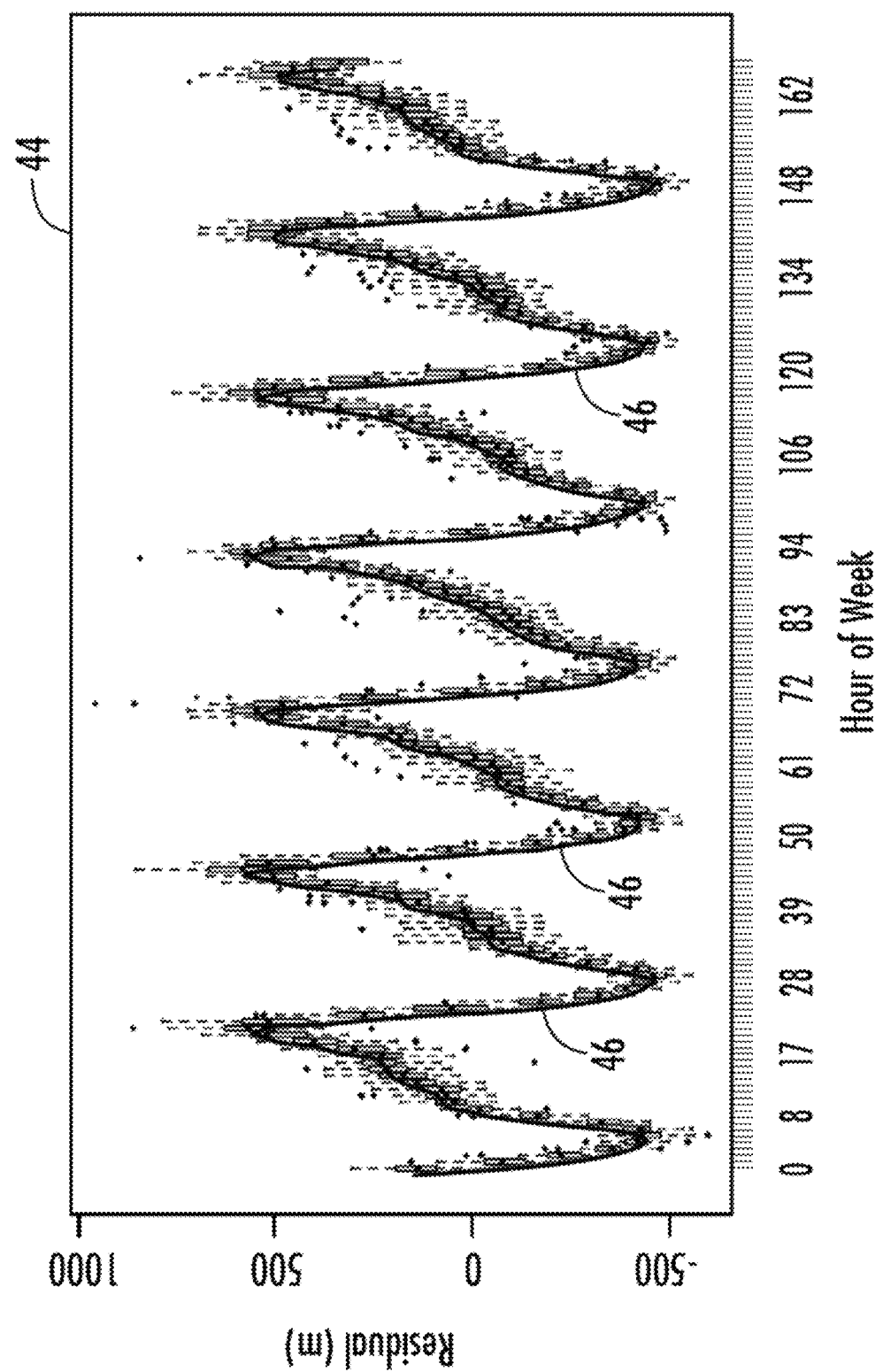
FIG. 3 illustrates a graph having an X-axis of ordinal time intervals and a Y-axis of a residual value that identifies the difference between aggregate service group utilization values and long-term service group utilization values at each interval in the week for each of 26 weeks.

FIG. 3 illustrates a graph 44 having an X-axis of ordinal time intervals and a Y-axis of a residual value that identifies the difference between $U_{t,i}$ and $L_{t,i}$ at each interval in the week for each of the 26 weeks. FIG. 3 also illustrates a line 46 that identifies the calculated $M_i$ at each interval pursuant to the formula above.

The controller 22 generates a standard deviation value Si for each ordinal time interval i according to the following formula:

$$S_i = \sqrt{\frac{1}{T-1}\sum_{i=1}^{T}(U_{t,i} - L_{t,i} - M_i)^2}$$

Figure 4:
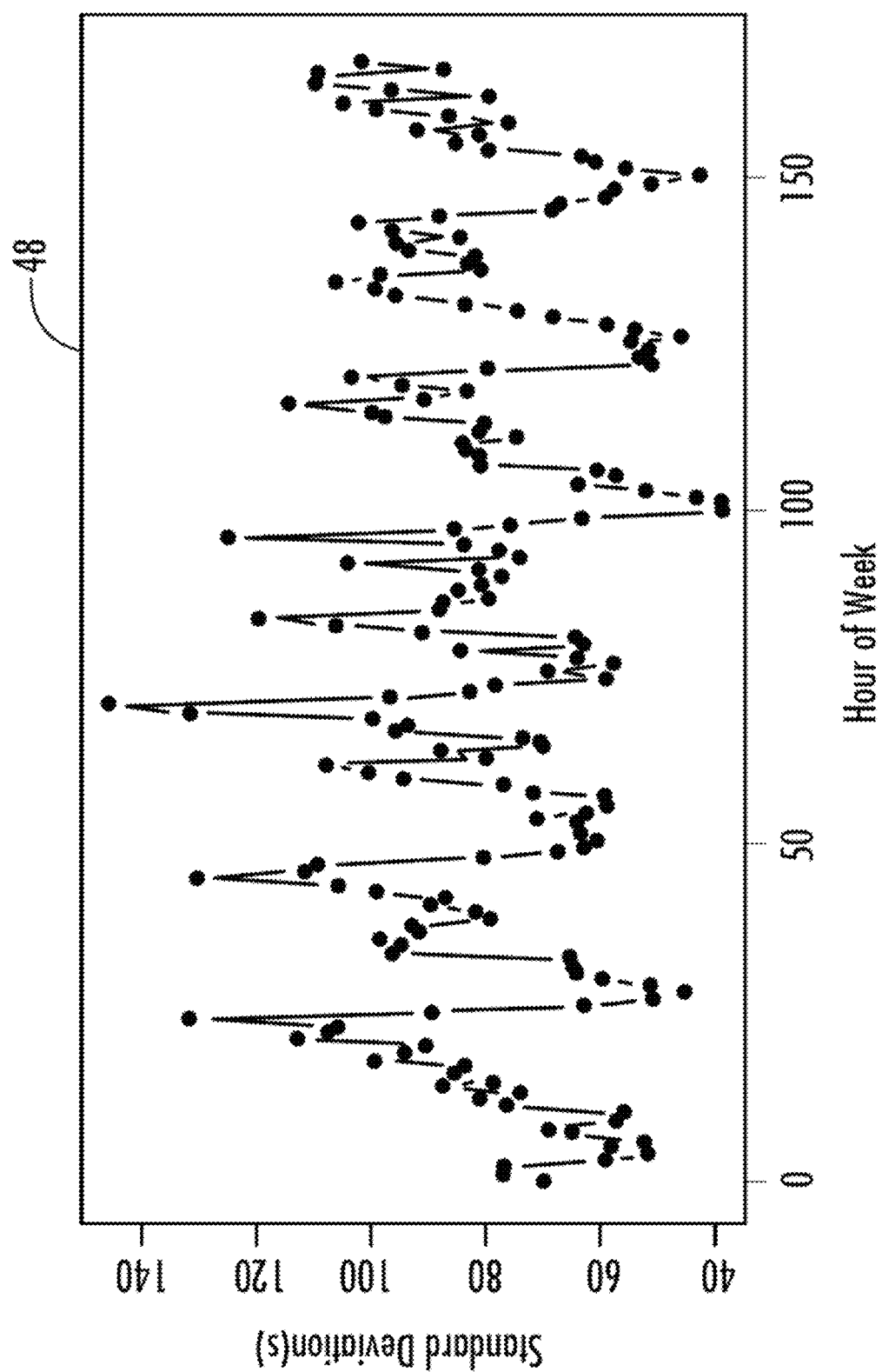
FIG. 4 illustrates a graph having an X-axis of ordinal time intervals and a Y-axis of the standard deviation value S.

FIG. 4 illustrates a graph 48 having an X-axis of ordinal time intervals and a Y-axis of the standard deviation value S.

The controller 22 generates a predicted or expected utilization Û at each time interval over the first period of time in accordance with the following formula:

$$\hat{U}_{t,i} = L_{t,i} + M_i$$

With these determined values, knowledge of the maximum capacity of the service group 30-1, and the service tiers of the cable modems 28-A-1-28-A-Y, it is possible to quantify usage of the service group 30-1 in various ways. One such metric is a Percent at Risk (PAR) metric. Given a particular speed tier, denoted herein as $T_m$, the controller 22 can determine the likelihood that the utilization level is so large that a cable modem 28 at the speed tier $T_m$ cannot obtain the allocated maximum bandwidth of the speed tier $T_m$ when performing, for example, a speed test. In essence, the determination is whether the service group 30-1 has sufficient buffer (i.e., capacity) to accommodate both the usual network traffic and a speed test at speed tier $T_m$.

This value may be referred to as the Modem-Interval PAR as it describes this probability at the specific time interval. Mathematically, this probability P may be written as $$P(U_{t,i}+T_m>C)$$

wherein $T_m$ is the particular speed tier (e.g., 20, 40, 100 Mbps, etc.) and C is the maximum bandwidth of the service group 30-1.

P represents the likelihood that the current utilization of the service group 30-1 plus one additional bandwidth demand at the speed tier $T_m$ surpasses the capacity of the service group 30-1. The estimator is denoted $$P_{t,i}(C-T_m)$$

and is defined as:

$$P_{t,i}(C-T_m) = \Phi\left(\frac{\hat{U}_{t,i} + T_m - C}{S_i}\right)$$

where $\Phi$ is the cumulative distribution function for the standard normal distribution. In the example presented, this corresponds with a PAR value for each hour of a week (each ordinal time interval) and is specific to each modem speed tier.

Figure 5:
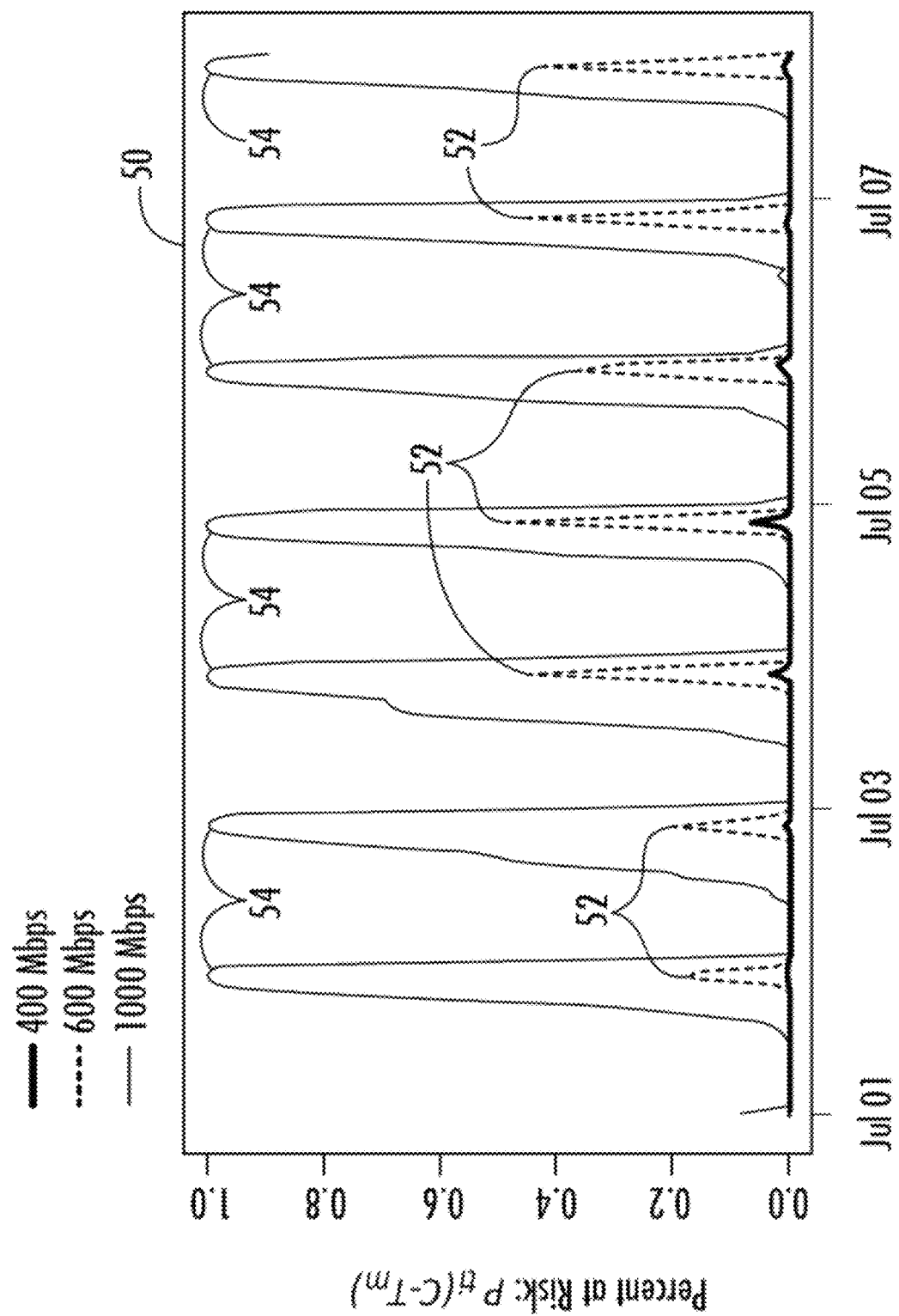
FIG. 5 illustrates a graph having an X-axis of ordinal time intervals for a particular second period of time, and a Y-axis of the percent at risk (PAR) for each of three speed tiers illustrating the probability that cable modems at the 400 Mbps speed tier, the 600 Mbps speed tier, and the 1000 Mbps speed tier will not be able to obtain their provisioned maximum bandwidth.

FIG. 5 illustrates a graph 50 having an X-axis of ordinal time intervals for a particular second period of time, and a Y-axis of the PAR $P_{t,i}(C-T_m)$ for each of three speed tiers illustrating the probability that cable modems at the 400 Mbps speed tier, the 600 Mbps speed tier, and the 1000 Mbps speed tier will not be able to obtain their provisioned maximum bandwidth. FIG. 5 illustrates that, for that particular second period of time t, a cable modem 28 at the 400 Mbps speed tier will almost always be able to obtain the 400 Mbps provisioned bandwidth, and a cable modem 28 at the 600 Mbps speed tier will generally be able to obtain the 600 Mbps provisioned bandwidth except for certain intervals 52 where the probability ranges from approximately 18% to approximately 45% that the cable modem 28 will not be able to obtain the 600 Mbps provisioned bandwidth. A cable modem 28 at the 1000 Mbps speed tier can more often than not obtain the 1000 Mbps provisioned bandwidth; however, at certain intervals 54 it is almost a 100% probability that the cable modem 28 will not be able to obtain the 1000 Mbps provisioned bandwidth.

A similar and related measure of the capacity of the service group 30-1 is to infer the likelihood that the typical utilization at a given interval is likely to overwhelm the capacity available on the service group 30-1. This measure captures the influence of fluctuations in utilization at a scale much smaller than the intervals over which data is captured (e.g., seconds, rather than minutes or hours). These fluctuations are accounted for by the standard deviation computed for each interval, Si. The formula for capacity failure probability is similar to the formula above, eliminating the additional term required for a speed test buffer (T). Mathematically, this quantity is defined as $P(U_{t,i}>C)$; the estimator is denoted $P_{t,i}(C)$, and is specified by the following formula:

$$P_{t,i}(C) = \Phi\left(\frac{\hat{U}_{t,i} - C}{S_i}\right)$$

where $\Phi$ is the cumulative distribution function for the Standard Normal Distribution, and C is the maximum bandwidth of the service group 30-1.

Averaging these interval-based metrics across the intervals in a second period of time leads to the service group Capacity Failure Probability (CFP) for the particular second period of time:

$$CFP = \frac{1}{I}\sum_{i=1}^{I} P_{t,i}(C)$$

Since the Capacity Failure Probability formula does not include the speed tier $T_m$ in the computation, these probabilities are much smaller than the PAR values. The same example service group shown in FIG. 5 above has a maximum hourly CFP of $2.7\times10^{-6}$ and an average CFP of $2.4\times10^{-8}$ (essentially zero).

Various metrics based on the modem-interval level values $PAR_{t,i}$ can be used to measure the quality of service at the modem and service group level.

Service Group Interval Level $PAR_i$

Averaging over all cable modems 28 in the service group 30-1 leads to a service group-interval level PAR for each interval (e.g., hour) of interest.

$$PAR_i = \frac{1}{M}\sum_{m=1}^{M} PAR_{t,i}$$

$$= \frac{1}{M}\sum_{m=1}^{M} P_{t,i}(C-T_m)$$

Figure 6:
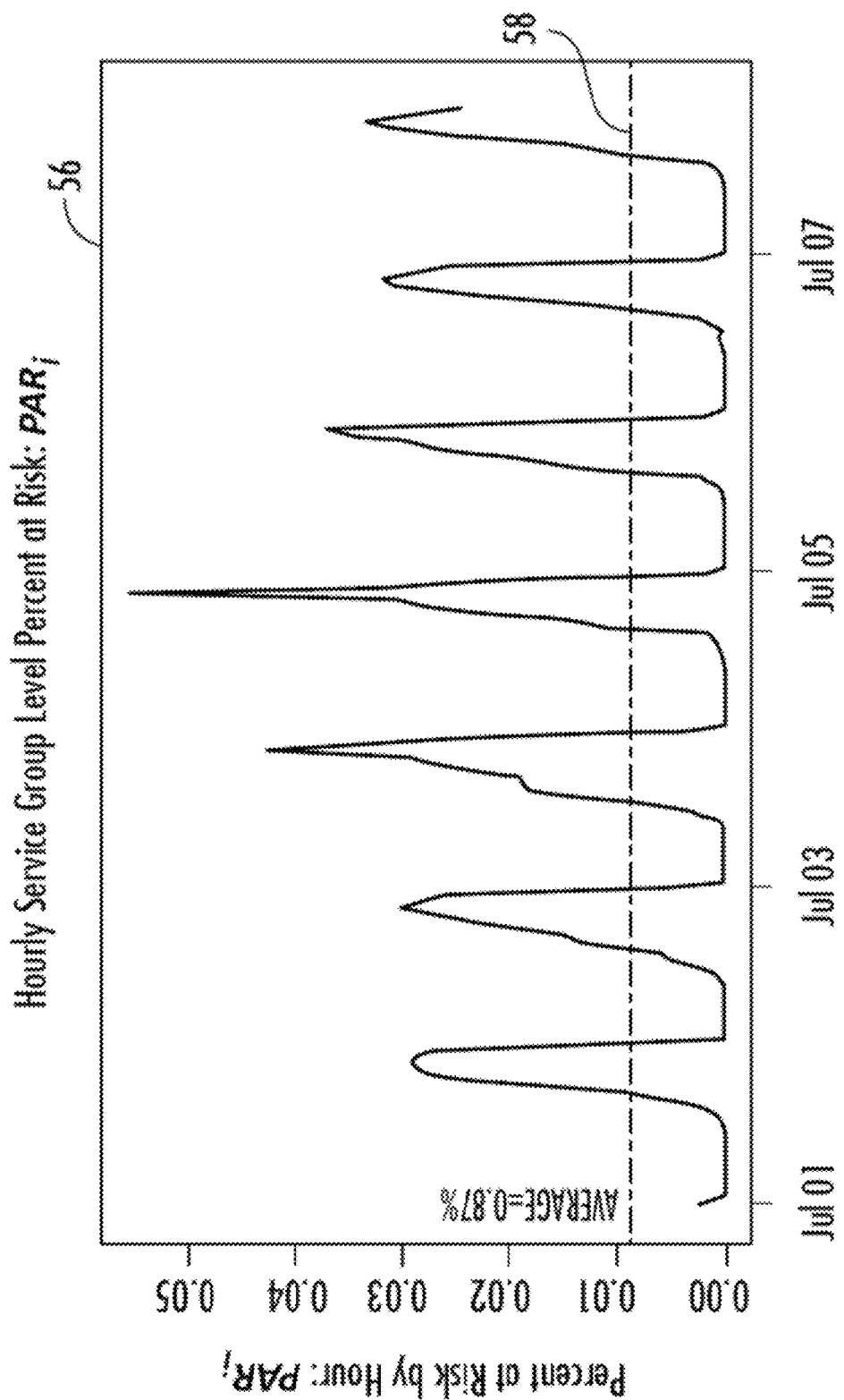
FIG. 6 illustrates a graph having an X-axis of ordinal time intervals for a particular second period of time, and a Y-axis of PAR by hour ($PAR_i$) for all the cable modems in a service group.

FIG. 6 illustrates a graph 56 having an X-axis of ordinal time intervals for a particular second period of time, and a Y-axis of Percent at Risk by hour ($PAR_i$) for all the cable modems 28 in the service group 30-1. A line 58 identifies the average PAR for all cable modems 28 in the service group 30-1 for the particular second period of time. The line 58 identifies an aggregate probability value based in part on a probability that a cable modem 28 of the plurality of cable modems 28 can obtain a maximum bandwidth allocated to the cable modem 28 at each interval of the/ordinal intervals. In some embodiments, in response to determining that the aggregate probability value (in this example, 0.87) is a non-preferred value, such as greater than 2 or 5 or 12 by way of non-limiting example, the controller 22 may send an alert indicating that the service group 30-1 is overutilized.

Averaging these values over all the intervals (hours) in a time period (week) yields a service group level PAR.

It may be desirable to weight certain speed tiers, or cable modems 28 differently. For example, it may be desirable to weight the cable modems 28 associated with certain types of customers more heavily than other types of customers (e.g., small business customers versus large business customers). As another example, referring to Table 1 above, it may be desirable to weight the cable modems 28 associated with certain speed tiers more heavily than other speed tiers (e.g., 1 Gbps speed tier versus 100 Mbps speed tier). Using weights, a weighted PAR, wPAR, can be determined in accordance with the following formula:

$$PAR = \frac{1}{I}\sum_{i=1}^{I} PAR_i$$

$$= \frac{1}{IM}\sum_{i=1}^{I}\sum_{m=1}^{M}P_{t,i}(C-T_m)$$

$$wPAR = \frac{1}{I}\sum_{i=1}^{I}wPAR_i$$

$$= \frac{1}{I\sum w_m}\sum_{i=1}^{I}\sum_{m=1}^{M}w_m P_{t,i}(C-T_m)$$

Figure 7:
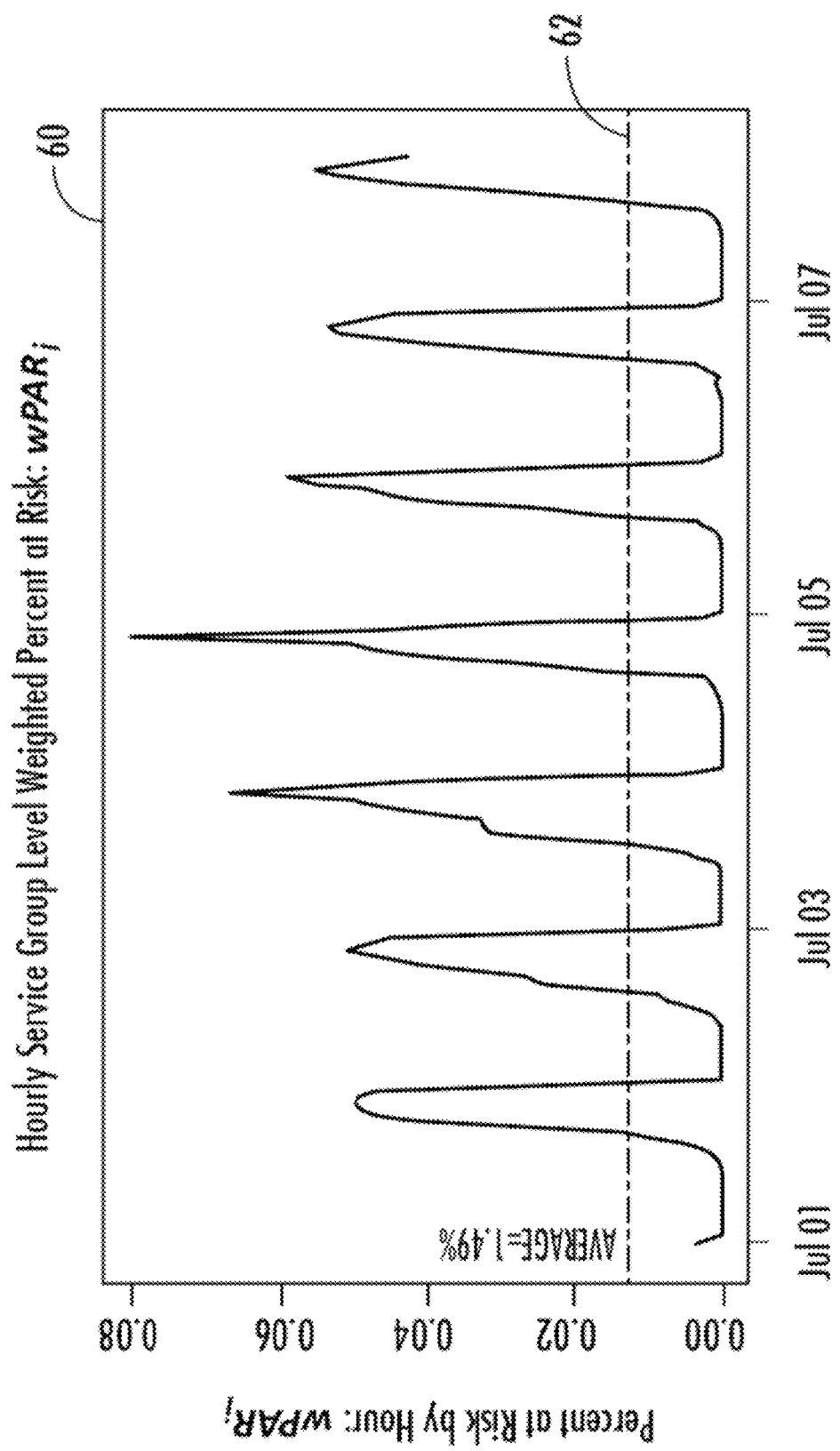
FIG. 7 illustrates a graph having an X-axis of ordinal time intervals for a particular second period of time, and a Y-axis of PAR by hour ($wPAR_i$) for all the cable modems in the service group.

FIG. 7 illustrates a graph 60 having an X-axis of ordinal time intervals for a particular second period of time, and a Y-axis of Percent at Risk by hour ($PAR_i$) for all the cable modems 28 in the service group 30-1. A line 62 identifies the weighted PAR, $wPAR_i$, for all cable modems 28 in the service group 30-1 for each interval (e.g., hour) in the particular second period of time. The line 62 also identifies an aggregate probability value based in part on a probability that a cable modem 28 of the plurality of cable modems 28 can obtain a maximum bandwidth allocated to the cable modem 28 at each interval of the/ordinal intervals. In some embodiments, in response to determining that the aggregate probability value (in this example, 1.49) is a non-preferred value, such as greater than 2 or 5 or 12 by way of non-limiting example, the controller 22 may send an alert indicating that the service group 30-1 is overutilized.

In some embodiments, if the controller 22 determines that the aggregate probability value is a non-preferred value, the controller 22 may determine an additional amount of capacity that will change the aggregate probability value to a preferred aggregate probability value and include, in the alert, a capacity identifier that identifies the additional amount of capacity.

Figure 8:
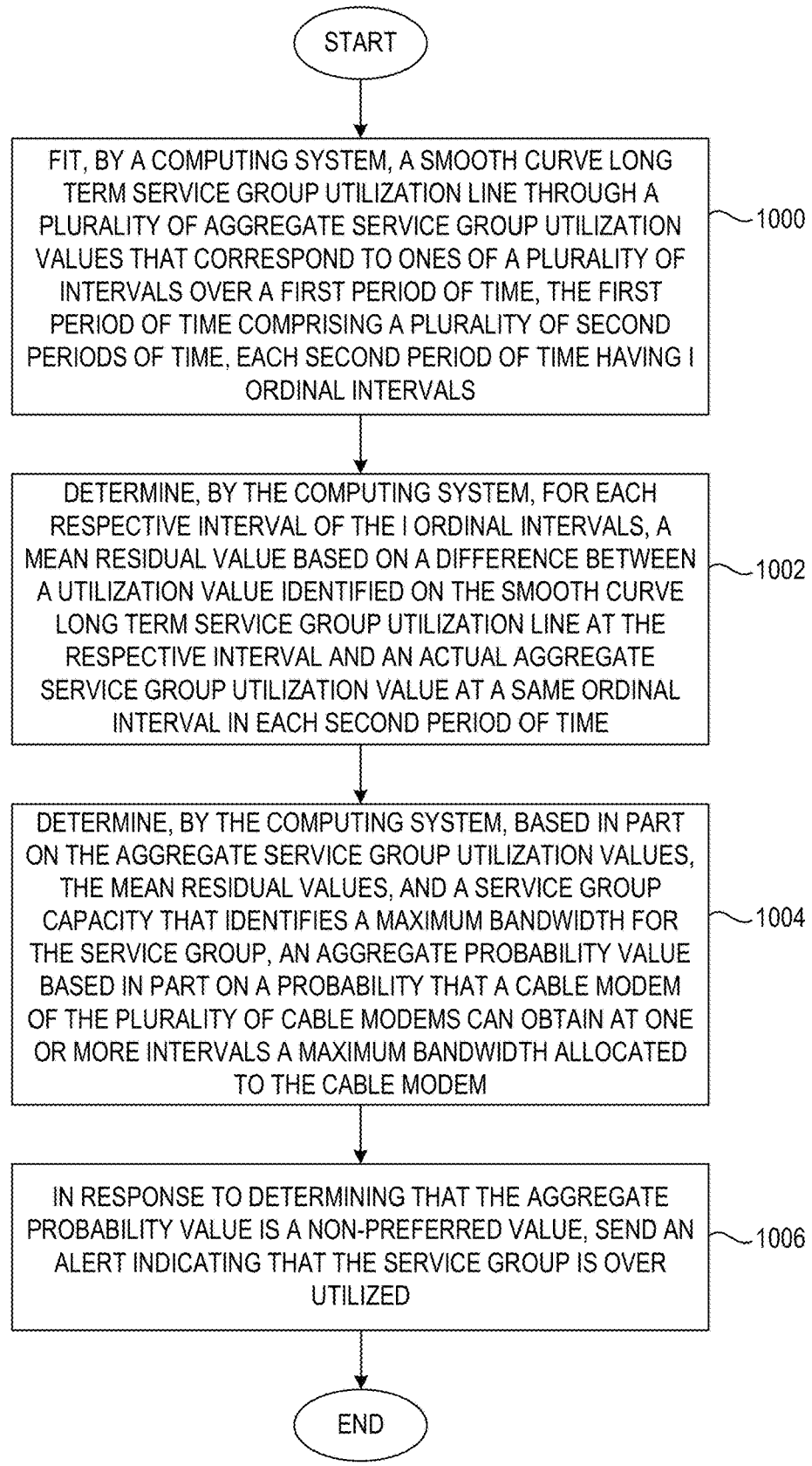
FIG. 8 is a flowchart of a method for determining service group capacity according to some embodiments.

FIG. 8 is a flowchart of a method for determining service group capacity according to some embodiments. FIG. 8 will be discussed in conjunction with FIG. 1.

The computing system 12 fits a smooth curve long-term service group utilization line through the plurality of aggregate service group utilization values that corresponds to ones of a plurality of intervals over the first period of time (e.g., six weeks), each aggregate service group utilization value identifying an aggregate service group bandwidth utilization by a plurality of cable modems in a service group at a corresponding interval of the plurality of intervals, the first period of time comprising the plurality of second periods of time (e.g., weeks), each second period of time having/ordinal intervals (FIG. 8, block 1000). The computing system 12 determines, for each respective interval of the/ordinal intervals, a mean residual value based on a difference between a utilization value identified on the smooth curve long-term service group utilization line at the respective interval and an actual aggregate service group utilization value at a same ordinal interval in each second period of time (FIG. 8, block 1002). The computing system 12 determines, based in part on the aggregate service group utilization values, the mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem (FIG. 8, block 1004). The computing system 12, in response to determining that the aggregate probability value is a non-preferred value, sends an alert indicating that the service group is overutilized (FIG. 8, block 1006).

The embodiments disclosed herein describe statistically sound mechanisms for determining objective capacity metrics for a service group 30 that can facilitate a determination that the service group 30 is overutilized prior to customer dissatisfaction, and thus the costs to modify the service group 30 are warranted. Such metrics can identify service groups 30 that are over-burdened and may require intervention.

Furthermore, such mechanisms can be relatively easily modified to identify important probabilities for service failures in the recent past that are likely to correlate with customer calls or interventions.

Modem Level Hourly Percent at Risk is the likelihood that any cable modem 28 on the service group 30-1 at a particular speed tier would fail a speed test at the specified interval. This value measures interval-by-interval (e.g., hour-by-hour) across second periods of time (e.g., weeks) in the example data.

Service Group Hourly Percent at Risk is the average of the cable modem 28 level hourly probabilities of speed test failure, where the average is over all cable modems 28 in the service group 30-1. This gives an hourly view into the performance of the service group 30-1.

Service Group Hourly Weighted Percent at Risk uses weights that represent the business value of each modem, find the weighted average modem level hourly probabilities of speed test failure, where the average is over all cable modems 28 in the service group 30-1. This yields a different view of the service group 30-1 that accounts for the chosen weighting variable.

Service Group Percent at Risk is the average hourly service group estimates over all hours in the week. This value is the percentage of all hours during a given week that are at risk.

Service Group Hourly Weighted Percent at Risk uses weights that represent the business value of a modem, find the weighted average modem level hourly probabilities of speed test failure, where the average is over all cable modems 28 in the service group.

Service Group Percent at Risk is the average of the cable modem level probabilities of speed test failure.

It is noted that, because the controller 22 is a component of the computing device 16, functionality implemented by the controller 22 may be attributed to the computing device 16 generally. Moreover, in examples where the controller 22 comprises software instructions that program the processor device 18 to carry out functionality discussed herein, functionality implemented by the controller 22 may be attributed herein to the processor device 18.

Figure 9:
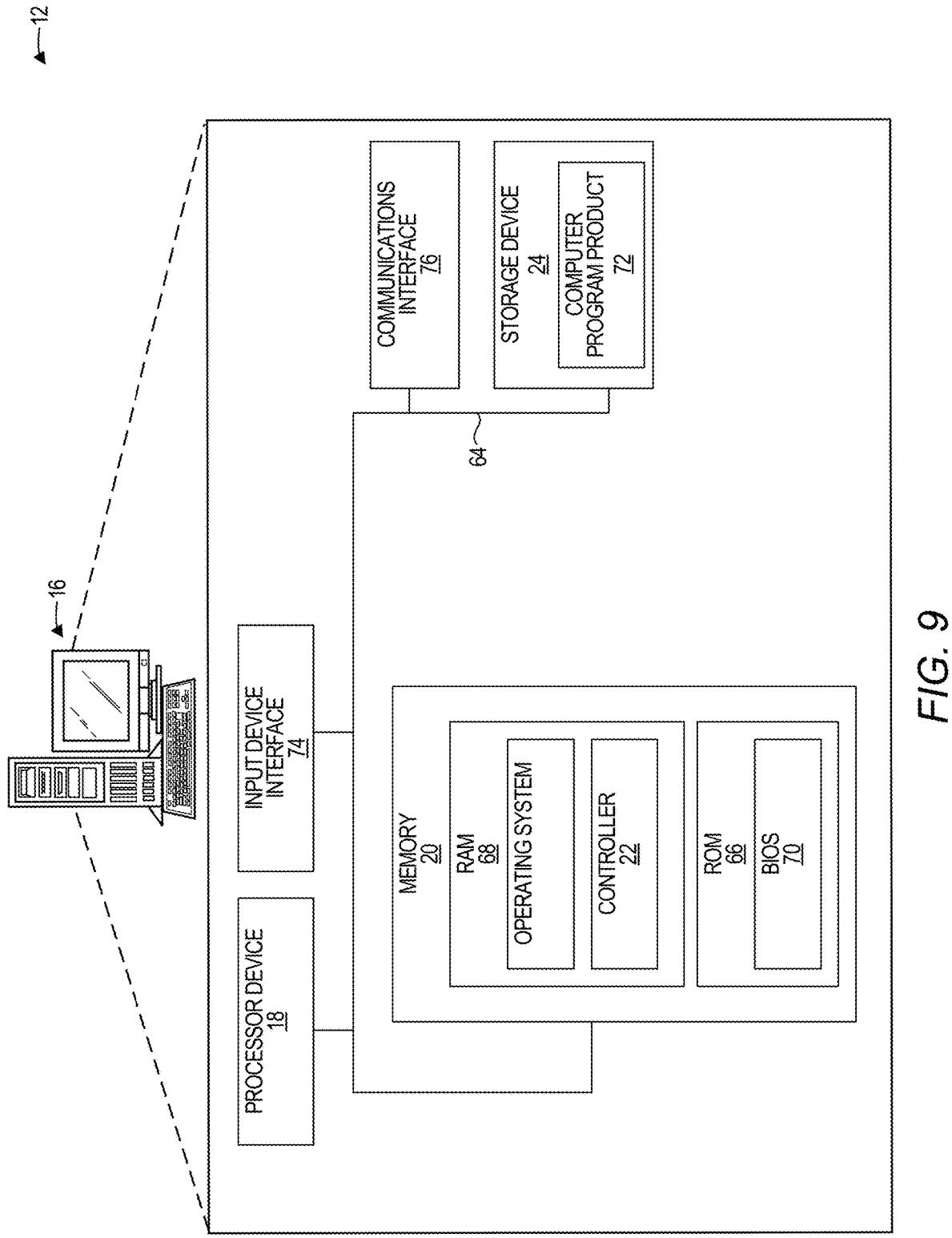
FIG. 9 is a block diagram of a computing system suitable for implementing examples according to one example.

FIG. 9 is a block diagram of the computing system 12 suitable for implementing examples according to one example. The computing system 12 includes one or more of computing devices 16, may comprise any computing or electronic device capable of including firmware, hardware, and/or executing software instructions to implement the functionality described herein, such as a computer server, a desktop computing device, a laptop computing device, or the like. The computing device 16 includes the processor device 18, the system memory 20, and a system bus 64. The system bus 64 provides an interface for system components including, but not limited to, the system memory 20 and the processor device 18. The processor device 18 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 20 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 16. The volatile memory 68 may also include a high-speed RAM, such as static RAM, for caching data.

The computing device 16 may further include or be coupled to a non-transitory computer-readable storage medium such as the storage device 24, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 24 and other drives associated with computer-readable media and computer-usable media may provide non-volatile storage of data, data structures, computer-executable instructions, and the like.

A number of modules can be stored in the storage device 24 and in the volatile memory 68, including an operating system and one or more program modules, such as the controller 22, which may implement the functionality described herein in whole or in part. All or a portion of the examples may be implemented as a computer program product 72 stored on a transitory or non-transitory computer-usable or computer-readable storage medium, such as the storage device 24, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the controller 22 in the volatile memory 68, may serve as a controller, or control system, for the computing device 16 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 18 through an input device interface 74 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 16 may also include a communications interface 76 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    fitting, by a computing system, a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having I ordinal intervals;
    determining, by the computing system, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time;
    determining, by the computing system, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem; and
    in response to determining that the aggregate probability value is a non-preferred value, sending an alert indicating that the service group is overutilized.

2. The method of claim 1 further comprising:
    receiving, by the computing system, from an aggregation device to which the plurality of cable modems in the service group is connected, the plurality of aggregate service group utilization values.

3. The method of claim 1 wherein each second period of time is a week, and l equals 168.

4. The method of claim 1 wherein fitting the smooth curve long-term service group utilization line through the plurality of aggregate service group utilization values comprises fitting the smooth curve long-term service group utilization line through the plurality of aggregate service group utilization values using a locally estimated scatterplot smoothing algorithm or a two-sided windowed averaging algorithm.

5. The method of claim 1 wherein determining, by the computing system, based in part on the aggregate service group utilization values, the mean residual values, and the service group capacity that identifies the maximum bandwidth for the service group, the aggregate probability value based in part on the probability that the cable modem of the plurality of cable modems can obtain, at the one or more intervals, the maximum bandwidth allocated to the cable modem comprises:
    determining, by the computing system, based in part on the plurality of aggregate service group utilization values, the mean residual values, and the service group capacity that identifies the maximum bandwidth for the service group, an aggregate probability value based in part on a probability that, for each respective speed tier of a plurality of speed tiers, a cable modem in the respective speed tier can obtain at the one or more intervals a maximum bandwidth that corresponds to the respective speed tier.

6. The method of claim 1 wherein the mean residual value for each respective interval is determined in accordance with the following formula:

$$M_i = \frac{1}{T}\sum_{t=1}^{T}(U_{t,i} - L_{t,i})$$

wherein t identifies a particular second period of time of the plurality of second periods of time T, i identifies a particular interval of the/ordinal intervals, L is a value of the smooth curve long-term service group utilization line at period of time t and the interval I, U is the value of the respective aggregate service group utilization value at the period of time t and the interval i, and $M_i$ is the mean residual value for the interval i.

7. The method of claim 1 further comprising:
determining, by the computing system, for each respective interval of the/ordinal intervals, a standard deviation value based on the utilization value identified on the smooth curve long-term service group utilization line at the respective interval, the actual aggregate service group utilization value at the same interval, and the mean residual value at the same interval; and wherein the aggregate probability value based in part on the probability that the cable modem of the plurality of cable modems can obtain at the one or more intervals the maximum bandwidth allocated to the cable modem is determined based in part on the smooth curve long-term service group utilization line, the mean residual values, the standard deviation values, and the service group capacity that identifies the maximum utilization for the service group.

8. The method of claim 1 further comprising:
determining, by the computing system, an additional amount of capacity that will change the aggregate probability value to a preferred value; and
including, in the alert, a capacity identifier that identifies the additional amount of capacity.

9. A computing system comprising:
one or more computing devices operable to:
    fit a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having/ordinal intervals;
    determine, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time;
    determine, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem; and
    in response to determining that the aggregate probability value is a non-preferred value, send an alert indicating that the service group is overutilized.

10. The computing system of claim 9 wherein the one or more computing devices are further operable to receive, from an aggregation device to which the plurality of cable modems in the service group is connected, the plurality of aggregate service group utilization values.

11. The computing system of claim 9 wherein to fit the smooth curve long-term service group utilization line through the plurality of aggregate service group utilization values, the one or more computing devices are further operable to fit the smooth curve long-term service group utilization line through the plurality of aggregate service group utilization values using a locally estimated scatterplot smoothing algorithm or a two-sided windowed averaging algorithm.

12. The computing system of claim 9 wherein to determine, based in part on the aggregate service group utilization values, the mean residual values, and the service group capacity that identifies the maximum bandwidth for the service group, the aggregate probability value based in part on the probability that the cable modem of the plurality of cable modems can obtain, at the one or more intervals, the maximum bandwidth allocated to the cable modem, the one or more computing devices are further operable to:
    determine, based in part on the plurality of aggregate service group utilization values, the mean residual values, and the service group capacity that identifies the maximum bandwidth for the service group, an aggregate probability value based in part on a probability that, for each respective speed tier of a plurality of speed tiers, a cable modem in the respective speed tier can obtain at the one or more intervals a maximum bandwidth that corresponds to the respective speed tier.

13. The computing system of claim 9 wherein the mean residual value for each respective interval is determined in accordance with the following formula:

$$M_i = \frac{1}{T}\sum_{t=1}^{T}(U_{t,i} - L_{t,i})$$

wherein t identifies a particular second period of time of the plurality of second periods of time T, i identifies a particular interval of the/ordinal intervals, L is a value of the smooth curve long-term service group utilization line at period of time t and the interval I, U is the value of the respective aggregate service group utilization value at the period of time t and the interval i, and $M_i$ is the mean residual value for the interval i.

14. The computing system of claim 9 wherein the one or more computing devices are further operable to:
    determine, for each respective interval of the/ordinal intervals, a standard deviation value based on the utilization value identified on the smooth curve long-term service group utilization line at the respective interval, the actual aggregate service group utilization value at the same interval, and the mean residual value at the same interval; and
    wherein the aggregate probability value based in part on the probability that the cable modem of the plurality of cable modems can obtain at the one or more intervals the maximum bandwidth allocated to the cable modem is determined based in part on the smooth curve long-term service group utilization line, the mean residual values, the standard deviation values, and the service group capacity that identifies the maximum utilization for the service group.

15. The computing system of claim 9 wherein the one or more computing devices are further operable to:

determine an additional amount of capacity that will change the aggregate probability value to a preferred value; and include, in the alert, a capacity identifier that identifies the additional amount of capacity.

16. A non-transitory computer-readable storage medium that includes executable instructions to cause one or more computing devices to:

fit a smooth curve long-term service group utilization line through a plurality of aggregate service group utilization values that corresponds to ones of a plurality of intervals over a first period of time, each aggregate service group utilization value identifying an aggregate service group bandwidth utilization by a plurality of cable modems in a service group at a corresponding interval of the plurality of intervals, the first period of time comprising a plurality of second periods of time, each second period of time having/ordinal intervals;

determine, for each respective interval of the/ordinal intervals, a corresponding mean residual value of a plurality of mean residual values based on a difference between a utilization value identified on the smooth curve long-term service group utilization line at the respective interval and an actual aggregate service group utilization value at a same ordinal interval in each second period of time;

determine, based in part on the plurality of aggregate service group utilization values, the plurality of mean residual values, and a service group capacity that identifies a maximum bandwidth for the service group, an aggregate probability value based in part on a probability that a cable modem of the plurality of cable modems can obtain at one or more intervals a maximum bandwidth allocated to the cable modem; and in response to determining that the aggregate probability value is a non-preferred value, send an alert indicating that the service group is overutilized.

17. The non-transitory computer-readable storage medium of claim 16 wherein the instructions further cause the one or more computing devices to be operable to receive, from an aggregation device to which the plurality of cable modems in the service group is connected, the plurality of aggregate service group utilization values.

18. The non-transitory computer-readable storage medium of claim 16 wherein to fit the smooth curve long-term service group utilization line through the plurality of aggregate service group utilization values, the instructions are further operable to cause the one or more computing devices to fit the smooth curve long-term service group utilization line through the plurality of aggregate service group utilization values using a locally estimated scatterplot smoothing algorithm or a two-sided windowed averaging algorithm.

19. The non-transitory computer-readable storage medium of claim 16 wherein to determine, based in part on the aggregate service group utilization values, the mean residual values, and the service group capacity that identifies the maximum bandwidth for the service group, the aggregate probability value based in part on the probability that the cable modem of the plurality of cable modems can obtain, at the one or more intervals, the maximum bandwidth allocated to the cable modem, the instructions are further operable to cause the one or more computing devices to:

determine, based in part on the plurality of aggregate service group utilization values, the mean residual values, and the service group capacity that identifies the maximum bandwidth for the service group, an aggregate probability value based in part on a probability that, for each respective speed tier of a plurality of speed tiers, a cable modem in the respective speed tier can obtain at the one or more intervals a maximum bandwidth that corresponds to the respective speed tier.

20. The non-transitory computer-readable storage medium of claim 16 wherein the mean residual value for each respective interval is determined in accordance with the following formula:

$$M_i = \frac{1}{T}\sum_{t=1}^{T}(U_{t,i} - L_{t,i})$$

wherein t identifies a particular second period of time of the plurality of second periods of time T, i identifies a particular interval of the/ordinal intervals, L is a value of the smooth curve long-term service group utilization line at period of time t and the interval I, U is the value of the respective aggregate service group utilization value at the period of time t and the interval i, and $M_i$ is the mean residual value for the interval i.

* * * * *